Aug. 8, 1961   R. G. HEAL   2,995,648
SPRING COILING APPARATUS
Filed Aug. 10, 1959   3 Sheets-Sheet 3

Inventor
Robert Garnett Heal
By his Attorneys

United States Patent Office 2,995,648
Patented Aug. 8, 1961

2,995,648
SPRING COILING APPARATUS
Robert Garnett Heal, St. Margarets-on-Thames, England, assignor to Staples & Company Limited, London, England, a British company
Filed Aug. 10, 1959, Ser. No. 832,768
Claims priority, application Great Britain Aug. 11, 1958
4 Claims. (Cl. 219—153)

This invention relates to spring coiling apparatus and particularly to apparatus for forming helical springs which are to be used for linking together the end convolutions of hour glass springs arranged in rows in the manufacture of spring mattresses.

It has been found that by heating the formed springs to an appropriate temperature they are better able to stand the stresses and strains to which they are subjected in the use of spring mattresses. It is important however, to carry out the heating of the wire uniformly throughout the length of the spring otherwise its shape, size and pitch of its convolutions may vary throughout its length rendering it unusable in an automatic machine for interlinking it with the end convolutions of a row of hour glass springs.

An object of the invention is to provide means for heating a spring for the above purpose so that its shape and size is maintained uniform throughout its length.

According to this invention a spring coiling apparatus is characterised in that means are provided for evenly heat-treating the convolutions of the spring, as the spring is passing through the apparatus, at a temperature appropriate for the purpose above described.

The temperature is dependent on various factors such as the nature of the metal employed for the spring, its rate of travel through the heating zone, but must not be so great as to impair the resilience of the wire. For example in the case of a steel wire containing carbon and manganese the temperature may be of the order of 400° F. to 500° F.

In the case where the apparatus comprises a storage reel from which the wire is continuously drawn, and a coiling mechanism through which the wire is passed by feeding means, a mechanism for cutting the resulting helical spring to the required length, the means for heat-treating the convolutions is disposed between the mechanism for coiling the wire and the mechanism for cutting the formed spring to the required length so that the spring is successively heated along the whole of its length.

In one arrangement according to the invention the means for heat-treating the wire comprises means for passing an electric current through the formed spring so as to raise it to the required temperature. For this purpose two contacts may be connected across a source of electric supply and are arranged to engage the convolutions of the formed spring at locations spaced apart along its length while it is moving.

The contacts may either be rigid or in the form of containers for mercury through which the formed spring travels.

At least those parts of the spring cutting mechanism which engage the wire are preferably electrically insulated, and the contact nearer the spring coiling mechanism is earthed.

In an alternative arrangement means may be provided for inducing an electric current in said formed spring, for example means may be provided for generating a high frequency electric field through which, said formed spring passes.

The wire feeding means may comprise two rollers arranged with their peripheries adjacent one another, one of which rollers is provided with a circumferential groove through which the wire passes and is gripped between the rollers at least one of which is power driven.

The coiling mechanism may be of the kind known as a giraffe comprising a fixed spindle formed with an axially extending groove leading to a helical groove of progressively decreasing pitch along which groove the wire is fed and a sleeve encircling the spindle and maintaining the wire in the groove whereby it is formed into a rotating and axially moving helix.

An electric motor driving the apparatus and the electric heating means for the spring may be connected in circuit with a source of electric supply through switch mechanism arranged to ensure that they are cut in and out simultaneously thus preventing the wire from being heated when the spring is no longer being formed.

The following is a description of one form of apparatus for manufacturing a helical spring according to the invention reference being made to the accompanying drawings in which.

Figure 1:
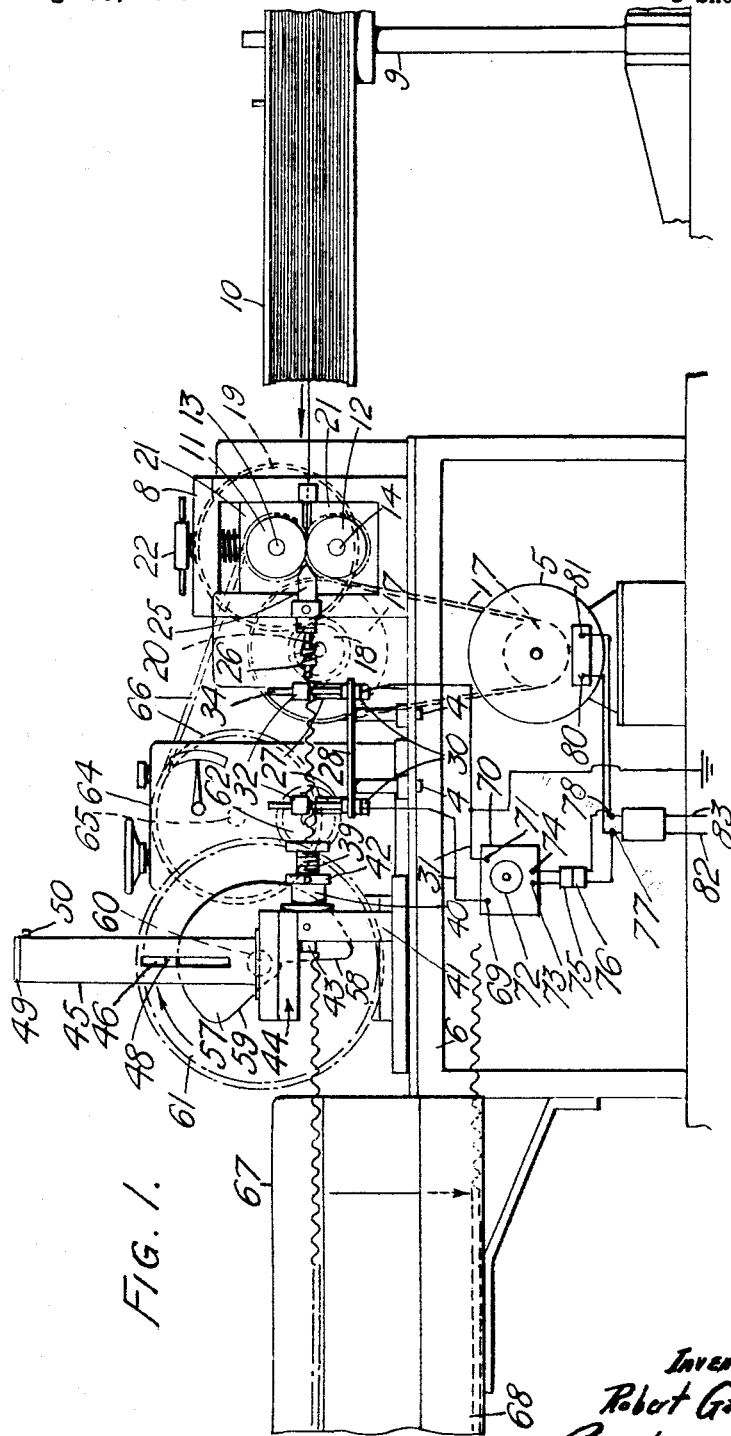
FIGURE 1 is a diagrammatic side elevation of the apparatus as a whole.
Figure 2:
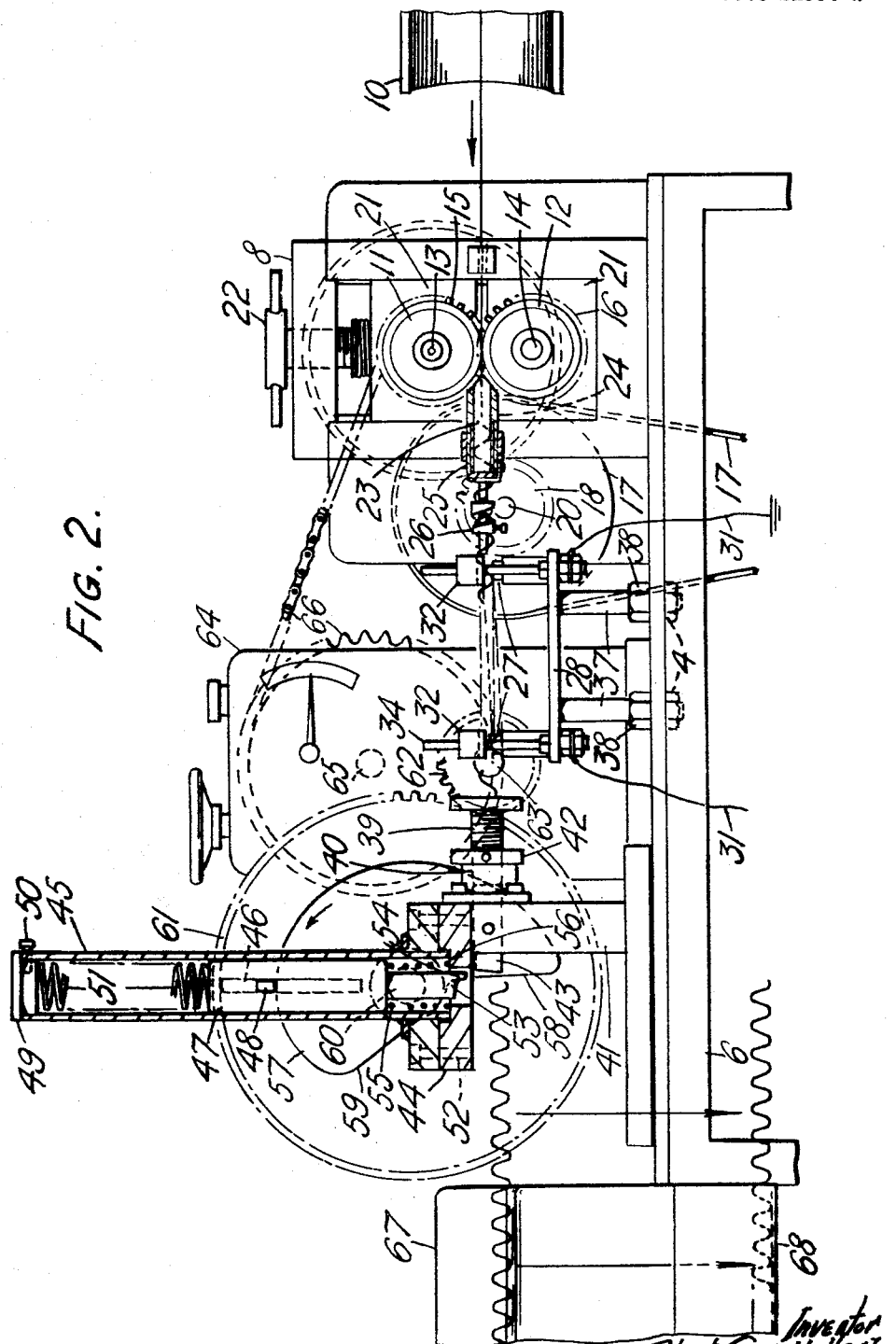
FIGURE 2 is a part side elevation and part vertical section through the apparatus on a larger scale.
Figure 3:
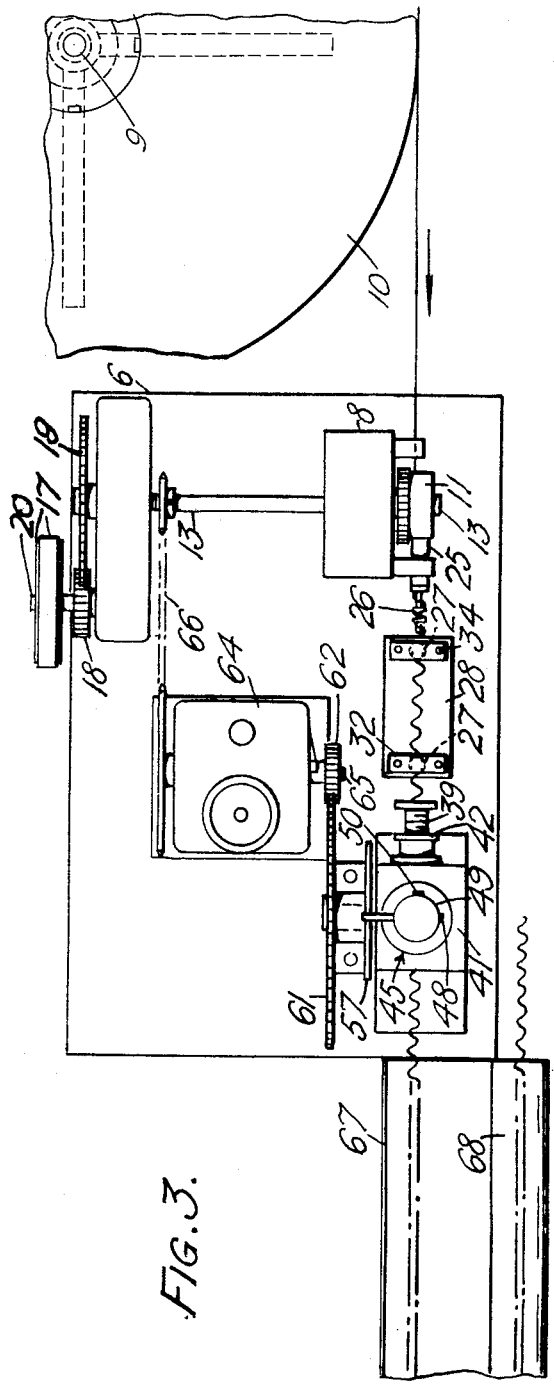
FIGURE 3 is a plan of the apparatus shown in FIGURE 1.

The apparatus comprises three main units, first a known mechanism for coiling the wire into a helix; second a mechanism for heating the wire after it has been coiled; third a mechanism for cutting the coiled wire into required lengths.

The known mechanism for coiling the wire into a helix comprises a storage reel 10 mounted to rotate about a vertical spindle 9. The wire is drawn from the reel by two rolls 11, 12 fixed to two horizontal shafts 13, 14, mounted one above the other in a framework 8 which shafts are geared together by pinions 15, 16, fixed to them. The wire passes through a guide 7 on the framework to the rolls.. The upper shaft 13 is driven from an electric motor 5 through reduction gearing comprising a belt transmission 17 and intermeshing gear wheels 18 and 19 on the pulley shaft 20 and the shaft 13 respectively. The roll 11 has a circumferential groove to accommodate the wire while the roll 12 is smooth and its shaft 14 is mounted in a bearing 21 which is adjustable towards and away from the other shaft by a screw press 22 whereby the wire may be firmly gripped between the rolls. The wire is fed into a known form of coiling device commonly known as a giraffe which comprises a fixed spindle 23 having a groove 24 formed in it which first extends in an axial direction and then continues as a helix of progressively decreasing pitch. The spindle is encircled by a sleeve 25 fixed to the framework which maintains the wire in the groove and finally the wire coil into a helix issues through a guide 26. The resulting axially moving and rotating wire helix then extends over two spaced electric contacts 27. The contacts comprise two copper heads fixed to a plate 28 of insulating material by threaded stems 29 which pass through holes in the plate and receive terminals 30 by which electric leads 31 are secured to them the lead connected to the contact nearer the giraffe is earthed.

The wire helix is maintained in engagement with each contact by a saddle piece 32 which rests on the helix and its under surface is provided with a part cylindrical recess 33 which extends around the helix. Each saddle is provided with two holes one on either side of the channel through which pass two guide rods 34 fixed to the insulating plate 28.

The insulating plate 28 is adjustable in an up and down direction by being supported on a base 6 by two threaded pillars 37 which pass through holes in the base and receive clamping nuts 4.

In one arrangement suitable for coiling 18 S.W.G., steel wire into a helix having an outer diameter of ⅜ inch and a pitch of about ⅜ inch the helix is passed at a rate of about 50 feet per minute over the contacts which are spaced apart from five to six inches and the amperage passing through the wire is about 80 amps. at a voltage of 8 volts. If the helix travels at a greater rate, a greater amperage is required for example at 100 feet per minute an amperage of 160 is required.

After being heated the wire helix is passed through the mechanism for cutting it to the required length. This mechanism comprises an externally threaded tubular guide or anvil 39 which passes through an internally threaded socket 40 carried by a bracket 41 mounted on the base 6. A clamping nut 42 is provided for holding the guide 39 in the required position in the socket 40. The end face of the anvil as indicated at 43 is at right angles or nearly at right angles to the axis of the anvil so that there is a slight clearance between it and the cutter when the cutter first approaches it but so that they contact with one another when the cutter reaches the wire. A part 44 of the bracket overhangs the end of the anvil and supports an upwardly extending cylinder 45. The cylinder is formed with a vertical slot 46 and contains a plunger 47 having a peg 48 which projects through the slot to the outside of the cylinder. The upper end of the cylinder is closed by a plug 49 which is retained in position by a screw 50. A compression spring 51 is disposed between the plug 49 and the upper face of the plunger 47. The lower end of the cylinder is provided with a flange which is secured to the upper face of the bracket by screws 52. The lower end 53 of the plunger 47 is reduced to square section and is formed with or has secured thereto a cutter 54. A rebound compression spring 55 encircles the reduced end 53 of the plunger and abuts against the shoulder between the two parts of the plunger and against the bottom of the recess 56 in the bracket. The projecting end of the peg 48 engages the periphery of a snail cam 57 formed from insulating material and having a rapid fall 58 and a rise 59 which extends around the cam from the bottom to the top of the fall. The cam is fixed to a horizontal spindle 60 extending at right angles to the axis of the cylinder 45 and mounted in bearings to one side of the bracket 41. This arrangement of the cutter mechanism enables it to be readily insulated from the rest of the apparatus for which purpose the bracket 41 is electrically insulated from the part 6 of the frame of the apparatus on which it is mounted and is arranged so as to have a small degree of adjustment in a direction towards and away from the giraffe which adjustment may require to be made should springs with different pitches of convolutions require to be formed. The horizontal spindle 60 has fixed to it a comparatively large gear wheel 61 which meshes with a pinion 62 fixed to the output shaft 63 of an infinitely variable gear box 64. The input shaft 65 of the gear box is driven by a chain and sprocket transmission 66 from the aforesaid motor driven upper shaft 13. With this arrangement during the revolution of the cam 57 the peg 48 in moving up the rise 59 compresses the spring 51 up to the time it reaches the top of the fall and during this time the cutter will be above the helical coil which is issuing from the tubular anvil having been heated. The peg 48 then comes opposite the rapid fall 58 and descends rapidly causing the cutter to cut the helix. The shoulder between the two parts of the plunger 47 and 53 will engage the rebound spring 55 withdrawing the cutter rapidly above the oncoming helix and the peg by this time is engaged by the rise 59 of the cam 57 preventing it from again descending. The gradual compression of the spring 51 by reason of the rise of the cam extending from the bottom to the top of the rise is of considerable importance since it prevents any sudden and excessive load being thrown on the driving transmission. This enables an infinitely variable gear of the friction type to be employed allowing changes in the length of the spring to be quickly and accurately made. Furthermore the rapid cutting under the action of the compression spring 51 enables the continuous manufacture of springs without stopping the machine which has heretofore been necessary and also allows electrical heat-treatment of the springs to be carried out continuously and accurately.

The helix as it passes from the anvil is received by an inclined platform 67 and when it is severed it rolls down the platform into a collecting trough 68. The inclined platform may be marked with a scale for the purpose of setting the length of the helix to be severed. The lead 31 from the contact 27 further from the giraffe is connected to one of the terminals 69 of the output of a transformer 70 the other lead 31 and the other output terminal 71 of the transformer being connected to the other contact 27 nearer giraffe and to earth. The input of the transformer is arranged for connection with the usual electric supply means. The transformer is so wound that output can supply 80 amperes at 8 volts and a variable resistance having a control knob 72 is associated with one of the transformer windings whereby the amperage and thus the heating of the spring may be varied. The terminals 73 and 74 of the input are connected through a plug and socket connection 75, 76 to two leads 77, 78 from a double pole motor switch 79 which contacts are also connected to the terminals 80, 81 of the motor 5. The other leads 82, 83 from the motor switch being connected to the mains. With this switch arrangement the motor and heating circuit can be cut in and out simultaneously while the motor can be energised without the heating circuit by removing the plug.

It will be appreciated that various modifications may be made to details of construction without departing from the scope of the invention. For example, as pointed out above, instead of electro-current being supplied to the spring by solid contacts bearing on the convolutions, the spring could be passed through electrically conducting receptacles containing mercury and connected to the mains or the spring could be passed through a high frequency electric field.

I claim:

1. A spring coiling apparatus comprising a coiling mechanism adapted to form a helical coil, wire feeding means on one side of the coiling mechanism adapted to feed the wire through the coiling mechanism so that a helical coil issues continuously from the other side thereof, a guillotine on the other side adapted periodically to operate on the moving helical coil so as to cut off predetermined lengths thereof and heating means disposed between the coiling mechanism and the guillotine and adapted continuously to heat a constant length of the moving coil after it has been formed and has issued from the coiling mechanism.

2. A spring coiling apparatus according to claim 1 wherein said heating means are electrically energized and an electric motor is arranged to drive the apparatus which electrical heating means and motor are connected in circuit with a source of electric supply through switch mechanism so as to ensure that they are cut in and out simultaneously thus preventing the wire from overheating when the spring is no longer being formed.

3. A spring coiling apparatus according to claim 1 wherein the means adapted continuously to heat a length of the helical coil comprises two contacts supported in an insulating manner by a platform across which contacts said spring moves and saddle pieces arranged over the spring opposite the contacts and means connecting the electric contacts with the source of supply.

4. A spring coiling apparatus according to claim 3 wherein at least that part of the guillotine which engages the wire to be cut is electrically insulated and the contact nearer the spring coiling mechanism is grounded.

References Cited in the file of this patent

UNITED STATES PATENTS

| | | |
|---|---|---|
| 2,548,735 | Meletti | Apr. 10, 1951 |
| 2,831,102 | Conrad | Apr. 15, 1958 |
| 2,831,103 | Conrad | Apr. 15, 1958 |